United States Patent
Richardson

(10) Patent No.: US 8,462,236 B2
(45) Date of Patent: Jun. 11, 2013

(54) METHOD OF OPERATING AN IMAGE SENSOR

(75) Inventor: Justin Richardson, Edinburgh (GB)

(73) Assignee: STMicroelectronics (R&D) Ltd., Marlow Bucks (GB)

( * ) Notice: Subject to any disclaimer, the term of this patent is extended or adjusted under 35 U.S.C. 154(b) by 1350 days.

(21) Appl. No.: 11/622,507

(22) Filed: Jan. 12, 2007

(65) Prior Publication Data
US 2007/0165124 A1    Jul. 19, 2007

(30) Foreign Application Priority Data
Jan. 13, 2006 (EP) .................................... 06250173

(51) Int. Cl.
*H04N 9/64* (2006.01)
*H04N 5/76* (2006.01)

(52) U.S. Cl.
USPC ........................................ 348/249; 348/231.9

(58) Field of Classification Search
USPC ................ 348/246, 247, 231.9, 14.1, 231.8, 348/241, 207.99, 240.99, 222.1, 231.99, 348/249, 294
See application file for complete search history.

(56) References Cited

U.S. PATENT DOCUMENTS

| | | | |
|---|---|---|---|
| 5,345,264 A | 9/1994 | Murata et al. | 348/235 |
| 6,396,539 B1* | 5/2002 | Heller et al. | 348/246 |
| 6,970,194 B1* | 11/2005 | Smith | 348/247 |
| 7,545,416 B2* | 6/2009 | Shimazu et al. | 348/231.9 |
| 2004/0119851 A1* | 6/2004 | Kaku | 348/239 |
| 2004/0196390 A1* | 10/2004 | Shimazu et al. | 348/231.99 |

FOREIGN PATENT DOCUMENTS
EP  1003332  5/2000

OTHER PUBLICATIONS
Lee et al., A Cost-Effective Demosaicked Image Enhancement for a Single Chip CMOS Image Sensor, Signal Processing Systems Design and Implementation, 2005, IEEE Workshop on Athens, Greece, Nov. 2-4, 2005, Piscataway, NJ, pp. 148-153.

* cited by examiner

*Primary Examiner* — Chieh M Fan
*Assistant Examiner* — Ahmed A Berhan
(74) *Attorney, Agent, or Firm* — Allen, Dyer, Doppelt, Milbrath & Gilchrist, P.A.

(57) ABSTRACT

An image sensor may include a shared memory resource, which can be selectively used by a digital filter for image scaling or by a defect correction circuit.

22 Claims, 1 Drawing Sheet

METHOD OF OPERATING AN IMAGE SENSOR

FIELD OF THE INVENTION

The present invention relates to a method of operating an image sensor, and to an associated image sensor. In particular, the image sensor can be a CMOS image sensor.

BACKGROUND OF THE INVENTION

It is known to provide an image sensor that can scale an image, that is to re-size the image. The image data is passed through a decimating digital filter to produce a reduced size image, for efficient display on small resolution screens or for use in applications such as a viewfinder mode of a video recorder, digital still camera (DSC), or an image sensor in general. The lesser amount of data that is required for each scaled image (as compared with the amount of data required for the full field of view image) also reduces data transfer and reduces processor power consumption. An increased frame rate can also be achieved.

The scaling is enabled by line memories associated with the image sensor. The line memories are used to combine pixels from successive rows for the reconstruction of the reduced resolution image. In a color image sensor, the line memories take into account the pattern of a color filter array (CFA), in which each row comprises information on only two out of three colors in the array. A common type of CFA is a Bayer array, in which one row comprises red and green filters, while an adjacent row comprises green and blue filters.

A scaling function is useful for various applications as mentioned above. Indeed, in the field of image sensors for mobile phones, a Standard Mobile Imaging Architecture (SMIA) has been proposed which defines specifications for mobile imaging functionality, mechanics, reliability, performance characterization, and interfaces. SMIA profile 2 specifies a mandatory image scaling function, and therefore imposes a requirement for line memories for performing the scaling.

The defectivity content of a viewed image can be improved by the use of digital filters. One of the simplest is a median filter applied to a kernel of three pixel values. This filter is a moving averager. As illustrated in FIG. 1, the central value (Cx) is replaced by the average of the two adjacent values, C1 and C2. This filter moves "on the fly" along the pixel rows.

The median filter is implemented by the simple addition of registers, the required number of which depends on the image sensor system's processing power. Because no line memory is required, little area is used. However, the median filter is destructive of high frequency data. For example, in an image which includes black text on a white background which is imaged at a distance, the sharp contrast between successive dark and light portions is destroyed by the median filter, and the text appears blurred.

Given the increasing resolution and image quality requirements of sensors used for mobile imaging, there is a very high probability of major point defects due to statistical process variation, thus meaning that the simple median filter is increasingly not a practical option.

More sophisticated defect correction algorithms that give accurate results for high frequency data rely on the use of their own dedicated line memories. These line memories take up a large amount of space on the image sensor chip.

SUMMARY OF THE INVENTION

According to a first aspect of the present invention, there is provided an image sensor comprising image scaling means, or an image scaler, and defect correction means, or a defect connector, and a memory means, or memory, which is at least partly shared between said image scaling means and defect correction means.

An image sensor comprises an array of photosensitive pixels with corresponding readout and signal processing electronics. The image scaling means performs a digital filtering for the scaling of a digital image, as described above, while the defect correction means applies a defect correction algorithm to detect and correct for anomalous pixel values read out from the pixel array of an image sensor. The portion of the memory means that is shared between said image scaling means and defect correction means can be referred to as a "shared memory means". The "sharing" of the memory means between the image scaling means and defect correction means is in the sense of the memory means being made available for use by either of the image scaling means and defect correction means. The memory means can be any type of memory element or elements that are used for the scaling or defect correction functions.

The image sensor may comprise switch means, or a switcher, for selectively allocating the shared memory means to be used with the image scaling means or the defect correction means. The image sensor may comprise control logic means, or control logic, for inputting a control signal to enable or disable each of the defect correction means or the image scaling means. The image sensor may comprise at least one register bank for the storage of the control signal status.

The shared memory means may be a sub-portion of either a memory means used by the image scaling means or a memory means used by the defect correction means. The memory means used by the image scaling means or the memory means used by the defect correction means may comprise a plurality of line memories. A "line memory" is interpreted as any memory that has enough capacity to store a word with a length corresponding at least to the number of bits received from a row of pixels in the image sensor. The shared memory means may comprise at least one line memory.

The defect correction means comprises a circuit means programmed for the operation of a defect correction algorithm. The defect correction algorithm is adapted to perform a defect correction algorithm as set out below.

The image scaling means may comprise a circuit programmed for the operation of a digital filtering algorithm for scaling an input image. The image sensor may be a CMOS image sensor.

According to a second aspect, there is provided a digital still camera including the image sensor of the first aspect. An actuator for image capture may be provided for operation by a user, with the actuator being connected to the switch means for concurrent operation therewith.

According to a third aspect, there is provided a mobile communications device including the image sensor of the first aspect. An actuator for image capture may be provided for operation by a user, with the actuator being connected to the switch means for concurrent operation therewith.

According to a fourth aspect, there is provided a method of operating an image sensor which comprises image scaling means, or an image scaler, and defect correction means, or a defect corrector. The method may comprise switching a shared memory means, or shared memory, for alternate use by one or the other of the image scaling means and defect correction means.

The method may further comprise the step of switching the image sensor between: (a) an image scaling mode wherein the image scaling means is enabled and the defect correction means is disabled, with the memory means being switched for operation with the image scaling means; and (b) an image capture mode wherein the image scaling means is disabled and the defect correction means is enabled, with the memory means being switched for operation with the defect correction means.

The shared memory means may be a sub-portion of a memory means used by one or other of the image scaling means and defect correction means. The step of switching the shared memory means may be controlled by a control logic means which inputs a control signal to enable or disable the image scaling means and/or the defect correction means.

The method may further comprise storing the control signal in a register bank. The shared memory means may comprise at least one line memory.

The step of defect correction may comprise sorting the values of a current pixel and of a plurality of neighboring pixels into rank order, and modifying the current pixel value on the basis of its place in the rank order. The value of the current pixel may be modified if its rank is greater than or less than predetermined maximum and minimum rank values.

The current pixel value may be replaced by the value of the pixel having the predetermined maximum rank value, if the current pixel value has a rank greater than said predetermined maximum rank value. The current pixel value may be replaced by the value of the pixel having the predetermined minimum rank value, if the current pixel value has a rank less than the predetermined minimum rank value. The current pixel value is left unchanged if the current pixel value has a rank less than the predetermined maximum rank value and greater than the predetermined minimum rank value.

The predetermined maximum rank value may be the highest ranking of the neighboring pixels and the predetermined minimum rank value may be the lowest ranking of the neighboring pixels. The image sensor may be a CMOS image sensor.

BRIEF DESCRIPTION OF THE DRAWINGS

The present invention will now be described, by way of example only, with reference to the accompanying drawings, in which.

DETAILED DESCRIPTION OF THE PREFERRED EMBODIMENTS

Figure 1:
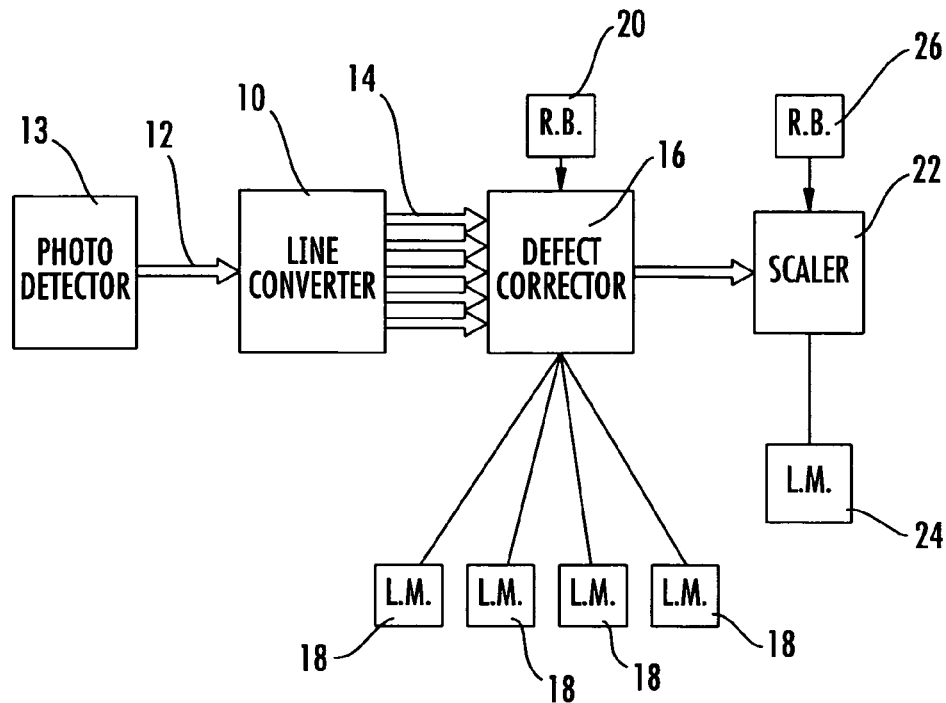
FIG. 1 illustrates components of a prior art image sensor.

Referring to FIG. 1, a prior art image sensor comprises a line converter 10 which receives image data 12 from a photodetecting circuit 13 and passes a line output to a defect correction circuit 16. The defect correction circuit 16 has a number of associated line memories 18, and has a local register bank 20 for the storage of filter control parameters. A scaler 22 is provided which has an associated line memory 24 for its operation. A local register bank 26 is provided for the storage of scaler control parameters.

The scaler 22, along with its associated line memory 24 is used to take image data as its input and to produce a reduced resolution or "scaled" image as its output. As mentioned above, the scaler is used when a device incorporating the image sensor is operated in a viewfinding mode, or other display mode where a reduced image resolution is advantageous. A scaler will typically require the use of a number of line memories (four are specified according to the SMIA profile 2 standard) for its operation. A line memory for the purposes of a scaler can also include extra memory allocation to take into account the extra memory required for the multiplication operations performed in scaling. The operation of a scaler is well known per se, and will not be described in more detail herein.

The defect correction circuit 16, using its associated line memories 18, acts on the image data to perform one or more image processing tasks, generally with a view to improving the image quality. This may include various ways of treating areas of the image which are over or under exposed, balancing image properties such as contrast, color and brightness, or may include defect correction to correct for permanent pixel defects or for individual erroneous readouts. The number of line memories 18 that are required depends on the nature of the defect correction, and can be as little as one.

As can be seen in FIG. 1, the defect correction circuit 16 has its own associated line memories 18, while the scaler 22 has its own associated line memory 24. When designing and constructing an image sensor, the defect correction circuit 16 and scaler 22 are considered as discrete modular components. The defect correction circuit and scaler 16, 22 are each provided with their own register banks 20, 26 and line memories 18, 24 so that each component is a self contained unit that performs a set function in the chip.

The space taken up by each line memory is highly significant. For a photodetecting circuit 13 comprising 2048 by 1536 pixels, each line memory has a size of 28K bit, which takes up a significant percentage of available space on the integrated circuit.

Figure 2:
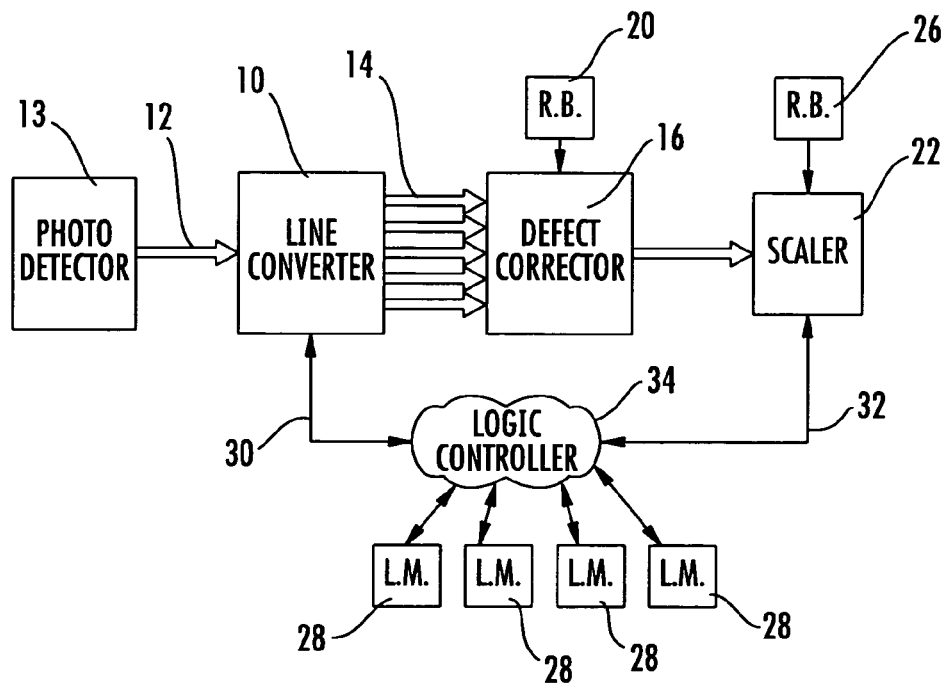
FIG. 2 illustrates components of an embodiment of a new image sensor.

FIG. 2 shows an embodiment of the invention, wherein one or more of the illustrated line memories 28 are selectively switchable between a first mode where line memory 28 is used for image scaling, and a second mode where the memory is used for digital filtering. The line memories 28 that are switchable can be considered to be a shared memory.

Components in FIG. 2 that are the same as shown in FIG. 1 are illustrated with the same reference numerals as appear in FIG. 1, and so further explanation of their functioning will not be given here.

In contrast to FIG. 1, the image sensor of FIG. 2 comprises line memories 28 that are connected to the line converter 10 via memory control line 30 and to the scaler 22 by memory control line 32. The use of the line memories 28 is controlled by logic circuit 34, which can allocate the line memories 28 for use by either the defect corrector 16 or the scaler 22. This enables the image sensor to switch between two mutually exclusive "modes": an image scaling mode where a line memory 28 is switched by the logic circuit 34 for use by the scaler 22 and where the defect correction circuit does not operate, and an image capture mode where all line memories 28 are switched by the logic circuit 34 for use by the defect correction circuit 16 and the scaler 22 does not operate.

Effectively, the provision of logic circuit 34 and memory control lines 30, 32 means that the scaler line memories 24 shown in FIG. 1 can be "re-used" as defect correction line memories 28 when a full field of view image is to be captured. This space efficient reuse of an existing memory resource for a secondary function means that an image sensor with both a scaling function and a sophisticated defect correction circuit can be fitted into a smaller area on an integrated circuit.

FIG. 2 illustrates an embodiment where all the available line memories 28 are switchable for use by either the scaler 22 or the defect correction circuit 16. As such, there is a single memory resource, which can be shared between the two components. However, in other embodiments, the shared memory elements may be only a subset of a larger memory resource.

For example, a subset of a relatively large defect correction memory could be selectively switched for use as a scaler memory, or vice versa. Alternatively, separate defect correction memories and scaler memories could be formed as part of the image sensor, with a relatively small portion overlapping as the shared memory means.

An image sensor can be incorporated in a number of different devices, such as a digital still camera (DSC), camera for a mobile phone or other communications device, webcam or optical mouse. The methods for incorporation of an image sensor into these end devices is well known, and will not be described in detail herein.

In a camera, an actuator button is provided which a user presses to capture an image. This button can have a connection with the logic circuit 34 shown in FIG. 2, such that, before the button is pressed, the image scaling mode is activated and the scaled images are displayed on the viewfinder on the camera. When the button is pressed, the logic circuit 34 switches the image sensor to the image capture mode for the capture of full field of view image data.

The number of line memories that are required for use with the defect correction circuit depends on the type of defect correction algorithm that is being used, and the type of image data 12 that is generated from the photodetecting circuit 13. The scope of the present invention is not limited to any particular defect correction algorithm, but a particular example will now be illustrated in detail, to help better understand the invention.

A so-called "scythe" defect correction algorithm used with image data collected from a photodetector circuit overlaid with a Bayer pattern color filter array operates on a 5×5 pixel kernel from which a center pixel and a color domain neighborhood of 8 pixels is extracted. The 8 pixel neighborhood is used to determine the validity of the corresponding center pixel. This is achieved using a Batcher-Banyan network which performs full, on-the-fly ranking of 8 pixel inputs. The square pattern is due to defect detection information only occurring in pixels of the same color and consequently the Bayer Pattern architecture of the raw image array defines the patterns shown.

This defect correction algorithm acts on every pixel in an image frame, excluding those in the 2 pixel border at the edges of the image. The ranked 8 pixel neighborhood is used to define a valid pixel range within which the center pixel should lie. If the center pixel is within the valid pixel range, no action is taken and it passes through the filter untouched. However, if the center pixel lies outside of this range, it is replaced with a function of an absolute scythe pixel, which is the neighborhood pixel which is at the extreme end of the valid pixel range closest to the center pixel, i.e. if the center pixel has a larger magnitude than the pixel at the high end of the valid pixel range, the absolute scythe pixel will be that high end pixel value.

Two six bit control signals are used to determine the 'aggressiveness' of the pixel correction. Each value of strength defines a weighted scythe pixel at a point between the weight outer limit pixel value and the absolute pixel value which is output as the processed pixel. Two bits of the strength control are used as a coarse ranking function and the remaining four bits are used as a weight value.

A large number of operations are performed to determine the filtered output pixel, and as a result it is not possible to calculate the output data in a single pixel clock period. Therefore the algorithm is pipelined to enable the required pixel clock rate to be achieved. In "cycle 0", the Batcher-Banyan sort is implemented with 6 stages of pixel comparisons. The first phase is used to perform the first 4 comparisons. No other computation is performed. In "cycle 1", the final 2 comparisons of the Batcher-Banyan sort are performed and all processing of the sorted data set to give the output data. This type of Bayer pattern based defect correction requires the use of four line memories, as is shown in FIGS. 1 and 2.

Various improvements and modifications can be made to the above without departing from the scope of the invention.

That which is claimed:

1. An image sensor comprising:
   an image scaler;
   a defect corrector configured to perform a defect correction algorithm;
   a shared memory at least partly shared between said image scaler and said defect corrector and comprising a plurality of line memories;
   said defect corrector being configured to perform the defect correction algorithm by at least switching the image sensor between
     an image scaling mode wherein said image scaler is enabled and said defect corrector is disabled, the shared memory being switched for operation with the image scaler, and
     an image capture mode wherein said image scaler is disabled and said defect corrector is enabled, the shared memory being switched for operation with the defect corrector, the switching between the image scaling mode and the image capture mode being based upon an image capture operation being initialized; and
   a logic controller configured to send a control signal to enable or disable said defect corrector and said image scaler, and to allocate at least one line memory from said plurality thereof for use by said image scaler during the image scaling mode and for use by said defect corrector during the image capture mode.

2. The image sensor of claim 1, further comprising a switcher selectively allocating the shared memory to be used with the image scaler or the defect corrector.

3. The image sensor of claim 1, further comprising at least one register bank storing a status of the control signal.

4. The image sensor of claim 1, wherein the shared memory comprises a sub-portion of a memory used by the image scaler.

5. The image sensor of claim 1, wherein the shared memory comprises a sub-portion of a memory used by the defect corrector.

6. The image sensor of claim 1, wherein the image scaler comprises a circuit programmed for operation of a digital filtering algorithm for scaling an input image.

7. The image sensor of claim 1, comprising an array of CMOS image sensing pixels upstream of the defect corrector.

8. An electronic device comprising:
   an image sensor including
     an image scaler,
     a defect corrector configured to perform a defect correction algorithm,
     a shared memory at least partly shared between said image scaler and said defect corrector and comprising a plurality of line memories,
     said defect corrector being configured to perform the defect correction algorithm by at least switching the image sensor between
       an image scaling mode wherein said image scaler is enabled and said defect corrector is disabled, the shared memory being switched for operation with the image scaler, and an image capture mode wherein said image scaler is disabled and said defect corrector is enabled, the shared memory being switched for operation with the defect corrector, the switching between the image scaling mode and the image capture mode being based upon an image capture operation being initialized, and a logic controller configured to send a control signal to enable or disable said defect corrector and said image scaler, and to allocate at least one line memory from said plurality thereof for use by said image scaler during the image scaling mode and for use by said defect corrector during the image capture mode.

9. The electronic device of claim 8, further comprising at least one register bank storing a status of the control signal.

10. The electronic device of claim 8, wherein the shared memory comprises a sub-portion of a memory used by the image scaler.

11. The electronic device of claim 8, wherein the shared memory comprises a sub-portion of a memory used by the defect corrector.

12. The electronic device of claim 8, wherein the electronic device comprises at least one of a digital camera, an integrated circuit, and a mobile communications device.

13. A method of operating an electronic device, the electronic device including an image sensor comprising an image scaler and a defect corrector, the method comprising:

switching a shared memory comprising a plurality of line memories for use by the image scaler or the defect corrector by at least switching the image sensor between an image scaling mode wherein the image scaler is enabled and the defect corrector is disabled, the shared memory being switched for operation with the image scaler, and an image capture mode wherein the image scaler is disabled and the defect corrector is enabled, the shared memory being switched for operation with the defect corrector, the switching between the image scaling mode and the image capture mode being based upon an image capture operation being initialized; and using a logic controller to send a control signal to enable or disable the defect corrector and the image scaler, and to allocate at least one line memory from the plurality thereof for use by the image scaler during the image scaling mode and for use by the defect corrector during the image capture mode.

14. The method of claim 13, wherein the shared memory is a sub-portion of a memory used by the image scaler.

15. The method of claim 13, wherein the shared memory is a sub-portion of a memory used by the defect corrector.

16. The method of claim 13, wherein the defect corrector sorts values of a current pixel and of a plurality of neighboring pixels into a rank order and modifies the current pixel value based upon its place in said rank order.

17. The method of claim 16, wherein the value of the current pixel is modified if its rank is greater than a predetermined maximum rank value or less than a predetermined minimum rank value.

18. The method of claim 17, wherein the current pixel value is replaced by the value of the pixel having said predetermined maximum rank value, if the current pixel value has a rank greater than said predetermined maximum rank value.

19. The method of claim 17, wherein the current pixel value is replaced by the value of the pixel having said predetermined minimum rank value, if the current pixel value has a rank less than said predetermined minimum rank value.

20. The method of claim 17, wherein the current pixel value is left unchanged if the current pixel value has a rank less than said predetermined maximum rank value and greater than said predetermined minimum rank value.

21. The method of claim 17, wherein said predetermined maximum rank value is the highest ranking of said neighboring pixels and said predetermined minimum rank value is the lowest ranking of said neighboring pixels.

22. The method of claim 13, wherein the image sensor comprises an array of CMOS image sensing pixels upstream of the defect corrector.

* * * * *